United States Patent
Bellorado et al.

(10) Patent No.: US 10,297,281 B1
(45) Date of Patent: May 21, 2019

(54) SERVO SECTOR DETECTION

(71) Applicant: Seagate Technology LLC, Cupertino, CA (US)

(72) Inventors: Jason Bellorado, San Jose, CA (US); Marcus Marrow, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/829,426

(22) Filed: Dec. 1, 2017

Related U.S. Application Data

(60) Provisional application No. 62/582,203, filed on Nov. 6, 2017.

(51) Int. Cl.
*G11B 5/596* (2006.01)
*G11B 19/20* (2006.01)
*G11B 15/087* (2006.01)

(52) U.S. Cl.
CPC .......... *G11B 5/59688* (2013.01); *G11B 19/20* (2013.01)

(58) Field of Classification Search
CPC ......... G11B 20/12; G11B 5/00; G11B 5/5965; G11B 5/59655; G11B 5/5543; G11B 27/36; G11B 5/09; G11B 20/10; G11B 15/005; G11B 5/59688; G11B 15/087; H04L 1/206; H04L 47/29
USPC ... 360/75, 77.07, 51, 29, 78.14, 72.2, 77.05, 360/39, 25, 31
See application file for complete search history.

(56) References Cited

U.S. PATENT DOCUMENTS

| | | |
|---|---|---|
| 5,321,564 A | 6/1994 | Takahashi |
| 5,742,532 A | 4/1998 | Duyne et al. |
| 5,970,093 A | 10/1999 | Lantremange |
| 6,157,510 A | 12/2000 | Schreck et al. |
| 6,320,920 B1 | 11/2001 | Beyke |
| 6,377,552 B1 | 4/2002 | Moran et al. |
| 6,670,901 B2 | 12/2003 | Brueske et al. |
| 6,687,073 B1 | 2/2004 | Kupferman |
| 6,697,891 B2 | 2/2004 | Emberty et al. |
| 6,738,215 B2 | 5/2004 | Yatsu |
| 6,950,258 B2 | 9/2005 | Takaishi |
| 6,993,291 B2 | 1/2006 | Parssinen et al. |

(Continued)

OTHER PUBLICATIONS

Bellorado et al., "Target Parameter Adaptation", U.S. Appl. No. 15/334,167, filed Oct. 25, 2016, Seagate Technology LLC.

*Primary Examiner* — Nabil Z Hindi
(74) *Attorney, Agent, or Firm* — Cesari & Reed, LLP; Kirk A. Cesari

(57) ABSTRACT

Systems and methods are disclosed for detection of a servo sector on a data storage medium. A circuit may be configured to sample a signal, and determine preamble sample values from the sample values that correspond to a preamble pattern. When a preamble is detected, the circuit may continue to perform preamble detection, as well as determine signal reading parameters to apply during a servo timing mark (STM) search state based on the preamble sample values. In response to locating the STM, the circuit may generate an indication that the STM is located. In response to not locating the STM, the circuit may extend an STM search timeout period when the preamble pattern is still detected, or increment an STM search counter when the preamble pattern is not detected. The circuit may exit the STM search state when the STM search counter exceeds the STM search timeout period.

20 Claims, 11 Drawing Sheets

(56) References Cited

U.S. PATENT DOCUMENTS

| | | |
|---|---|---|
| 7,046,701 B2 | 5/2006 | Mohseni et al. |
| 7,133,233 B1 | 11/2006 | Ray et al. |
| 7,245,448 B2 | 7/2007 | Urata |
| 7,298,573 B2 | 11/2007 | Kitamura |
| 7,324,437 B1 | 1/2008 | Czylwik et al. |
| 7,362,432 B2 | 4/2008 | Roth |
| 7,940,667 B1 | 5/2011 | Coady |
| 8,139,301 B1 | 3/2012 | Li et al. |
| 8,172,755 B2 | 5/2012 | Song et al. |
| 8,400,726 B1 | 3/2013 | Wu et al. |
| 8,456,977 B2 | 6/2013 | Honma |
| 8,479,086 B2 | 7/2013 | Xia et al. |
| 8,514,506 B1 | 8/2013 | Li et al. |
| 8,539,328 B2 | 9/2013 | Jin et al. |
| 8,542,766 B2 | 9/2013 | Chekhovstov et al. |
| 8,713,413 B1 | 4/2014 | Bellorado et al. |
| 8,755,139 B1 * | 6/2014 | Zou ............ G11B 5/746 360/51 |
| 8,760,794 B1 * | 6/2014 | Coker ......... G11B 5/59655 360/77.08 |
| 8,837,068 B1 | 9/2014 | Liao et al. |
| 8,861,111 B1 | 10/2014 | Liao et al. |
| 8,861,112 B1 | 10/2014 | Pan et al. |
| 8,953,276 B1 | 2/2015 | Pokharel |
| 9,007,707 B1 | 4/2015 | Lu et al. |
| 9,019,642 B1 | 4/2015 | Xia et al. |
| 9,064,537 B1 | 6/2015 | Nie |
| 9,082,418 B2 | 7/2015 | Ong et al. |
| 9,093,115 B1 | 7/2015 | Fung et al. |
| 9,099,132 B1 | 8/2015 | Grundvig et al. |
| 9,129,650 B2 | 9/2015 | Mathew et al. |
| 9,147,416 B2 | 9/2015 | Grundvig et al. |
| 9,196,298 B1 | 11/2015 | Zhang et al. |
| 9,245,579 B2 | 1/2016 | Song et al. |
| 9,245,580 B1 | 1/2016 | Lu et al. |
| 9,257,135 B2 | 2/2016 | Ong et al. |
| 9,286,915 B1 | 3/2016 | Dziak et al. |
| 9,311,937 B2 | 4/2016 | Zou et al. |
| 9,401,161 B1 | 7/2016 | Jury |
| 9,424,878 B1 | 8/2016 | Dziak et al. |
| 9,431,052 B2 | 8/2016 | Oberg et al. |
| 9,508,369 B2 | 11/2016 | Chu et al. |
| 9,542,972 B1 | 1/2017 | Nayak et al. |
| 9,564,157 B1 | 2/2017 | Trantham |
| 9,590,803 B2 | 3/2017 | Derras et al. |
| 9,672,850 B2 | 6/2017 | Grundvig et al. |
| 9,728,221 B2 | 8/2017 | Oberg et al. |
| 9,819,456 B1 * | 11/2017 | Bellorado ....... G11B 20/10009 |
| 9,947,362 B1 | 4/2018 | Venkataramani et al. |
| 2002/0181439 A1 | 12/2002 | Orihashi et al. |
| 2003/0198165 A1 | 10/2003 | Mouri et al. |
| 2010/0290153 A1 | 11/2010 | Hampshire |
| 2011/0090773 A1 | 4/2011 | Yu et al. |
| 2011/0176400 A1 | 7/2011 | Gerasimov |
| 2012/0105994 A1 | 5/2012 | Bellorado et al. |
| 2012/0155577 A1 | 6/2012 | Shukla et al. |
| 2017/0249206 A1 | 8/2017 | Jeong et al. |

\* cited by examiner

SERVO SECTOR DETECTION

SUMMARY

In certain embodiments, an apparatus may comprise a circuit configured to detect a servo pattern within a signal, including performing a preamble detection operation to detect a preamble pattern within the signal. In response to detecting the preamble pattern, the circuit may initiate a servo timing mark (STM) search state to locate an STM, and continue to perform the preamble detection operation. In response to locating the STM, the circuit may generate an indication that the STM is located. In response to not locating the STM, the circuit may extend an STM search timeout period when the preamble pattern is still detected, or increment an STM search counter when the preamble pattern is not detected. The circuit may exit the STM search state when the STM search counter exceeds the STM search timeout period.

In certain embodiments, an apparatus may comprise a circuit configured to detect a servo pattern within a signal obtained from a data storage medium. The circuit may sample the signal to obtain sample values, and determine preamble sample values from the sample values that correspond to a preamble pattern in the signal. The circuit may determine signal reading parameters to apply during a servo timing mark (STM) search state, to locate an STM in the signal, based on the preamble sample values, and detect the STM using the signal reading parameters.

In certain embodiments, an apparatus may comprise a circuit configured to detect a synchronization pattern within a signal from a data storage medium. The circuit may sample the signal using an analog to digital converter (ADC) to obtain preamble sample values from a preamble pattern of the signal, determine signal reading parameters to apply based on the preamble sample values, and detect the synchronization pattern using the signal reading parameters.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
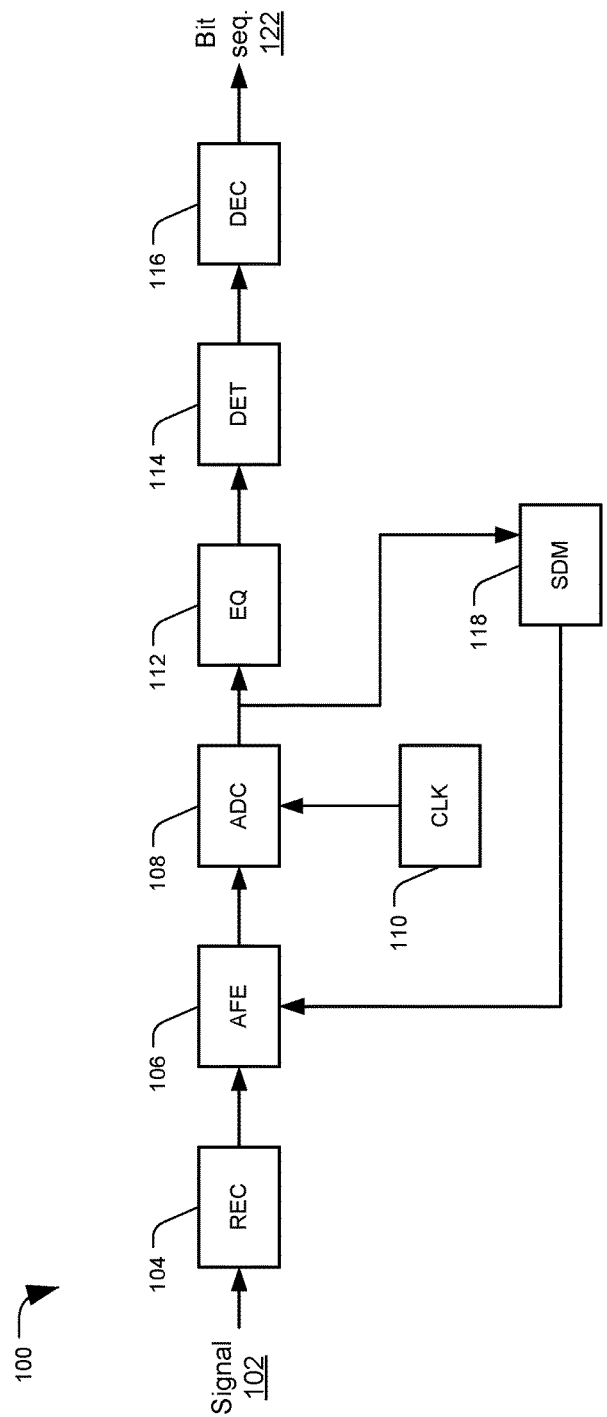
FIG. 1 is a diagram of a system configured to perform servo sector detection, in accordance with certain embodiments of the present disclosure.

FIG. 1 is a diagram of a system configured to perform servo sector detection, generally designated 100, in accordance with certain embodiments of the present disclosure. The system 100 may include components of a communications channel by which an information signal 102 is received and processed to obtain data, such as a sequence of bits 122. The channel may include circuitry, registers, and modules configured to perform operations in relation to a signal, and may be included on one or more chips of a device. A channel may be employed at a receiving end of wired or wireless transmissions, or in devices such as hard drives for storing data to and retrieving data from a storage medium. Some storage devices, such as hard disc drives, may include more than one channel, such as a data channel for processing data storage sectors, and a servo channel for processing servo sectors. Although examples and illustrative embodiments provided herein may be directed to implementations within a data storage device (DSD), the applicability of the techniques are not limited thereto. Similarly, while examples provided herein may be directed to synchronization signal patterns such as servo timing marks, other signal patterns may be detected as described herein.

System 100 may include a receiver 104 configured to receive a signal 102. For example, the receiver 104 may be an antennae that receives wireless signals 102, or a read head that detects magnetic fields 102 stored to a hard drive. The receiver 104 may provide the received signal to an analog front end (AFE) 106, which may be circuitry configured to condition an analog signal via amplifiers, filters, and other operations, before providing the conditioned signal to other components for further processing. An analog to digital converter (ADC) 108 may periodically sample the conditioned analog signal at a frequency controlled by a clock signal generator 110. Sampling the signal at the ADC 108 may include converting a continuous physical quantity (e.g. voltage) of the signal into a digital number or value representing the quantity's amplitude. The sampled values may be used to determine patterns in the signal which may be used to extract digital bits of information from the signal. The digital values from the ADC 108 may be provided to an equalizer 112, which may reverse or reduce distortions in the signal. The equalized signal may be provided to a detector 114, which may determine the bit sequence provided by the signal based on the sampled values from the ADC (e.g. whether the sample values indicate a 1 or a 0). The detected bit stream may be passed to a decoder 116, which may decode the bit stream into usable data. For example, the data in the signal 102 may be encoded with an error correction code, and the decoder 116 may attempt to determine and correct errors in the received detected bits based on the error correction code. The decoder 116 may output a bit sequence 122 of decoded and error-corrected bits, representing the data encoded within the signal 102.

Channel 100 may be used to detect particular patterns within a signal, and generate feedback based on the signal to adjust parameters of the channel 100. For example, servo sectors recorded to a hard disc or other rotating storage media may be used to identify a location of the receiver 104 (e.g. a read or write head) relative to the disc, as well as to set parameters of the channel 100 to facilitate reading data from the disc. The channel 100 may first need to locate and identify the data pattern of a servo sector in order to establish the positioning of the receiver 104. Accordingly, system 100 may include a servo detection module (SDM) 118. The SDM 118 may identify a selected signal pattern such as a servo sector by locating a servo preamble (a fixed pattern preceding a servo sector) and a synchronization pattern (e.g. a servo timing mark (STM)). The SDM 118 may identify the pattern based on sampled values from the ADC 108 or from another component, e.g. after the samples have undergone additional processing. The SDM 118 may further adjust a sampling phase, a signal amplitude, other parameters, or any combination thereof based on the preamble to facilitate the identification of the STM. For example, the SDM 118 may adjust the signal amplitude by modifying a signal gain at the AFE 106 based on samples from a servo preamble pattern. The detection of servo sectors and the adjustment of system 100 parameters will be discussed in greater detail in regards to the following figures.

As discussed above, a servo sector may include a preamble, followed by a sync mark or servo timing mark. Once the SDM 118 identifies a preamble, it may then search for an expected STM. Once the STM is detected, the system 100 may then read the data following the STM from the servo sector. Example data storage device (DSD) systems including a channel 100 are shown in regard to FIGS. 2-5.

Figure 2:
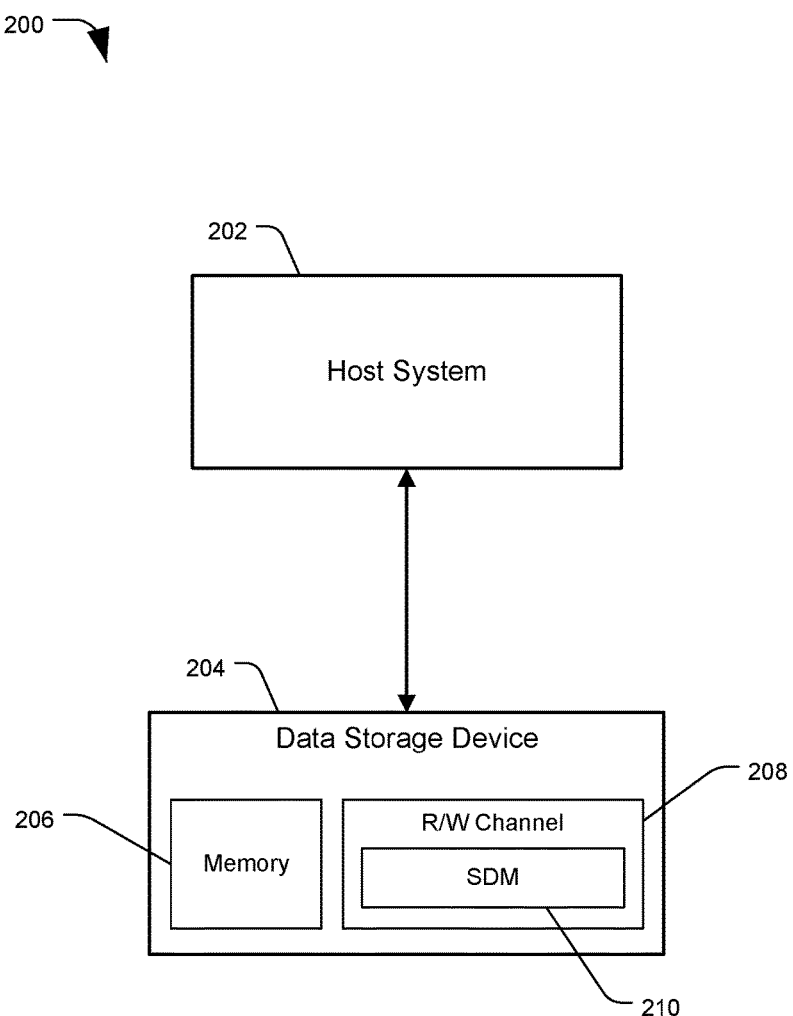
FIG. 2 is a diagram of a system configured to perform servo sector detection, in accordance with certain embodiments of the present disclosure.

FIG. 2 is a diagram of a system configured to perform servo sector detection, generally designated 200, in accordance with certain embodiments of the present disclosure. The system 200 may include a host 202 and a data storage device (DSD) 204. The host 202 may also be referred to as the host system or host computer. The host 202 can be a desktop computer, a laptop computer, a server, a tablet computer, a telephone, a music player, another electronic device, or any combination thereof. Similarly, the DSD 204 may be any of the above-listed devices, or any other device which may be used to store or retrieve data, such as a hard disc drive (HDD). The host 202 and DSD 204 may be connected by way of a wired or wireless connection, or by a local area network (LAN) or wide area network (WAN). In some embodiments, the DSD 204 can be a stand-alone device not connected to a host 202 (e.g. a removable data storage device having its own case or housing), or the host 202 and DSD 204 may both be part of a single unit (e.g. a computer having an internal hard drive).

The DSD 204 may include a memory 206 and a read/write (R/W) channel 208, such as the channel described in regards to FIG. 1. The memory 106 may comprise one or more data storage mediums, such as magnetic storage media like disc drives, other types of memory, or a combination thereof. The DSD 204 may receive a data access request, such as a read or write request, from the host device 202. In response, the DSD 204 may perform data access operations on the memory 206 via the R/W channel 208 based on the request. The R/W channel 208 may comprise one or more circuits or processors configured to process signals for recording to or reading from the memory 206.

DSD 204 may include a servo detection module (SDM) 210, such as the SDM 118 of FIG. 1. The SDM 210 may perform the methods and processes described herein to locate a servo sector based on a received signal. A more detailed example of a DSD configured for servo sector detection is depicted in FIG. 3.

Figure 3:
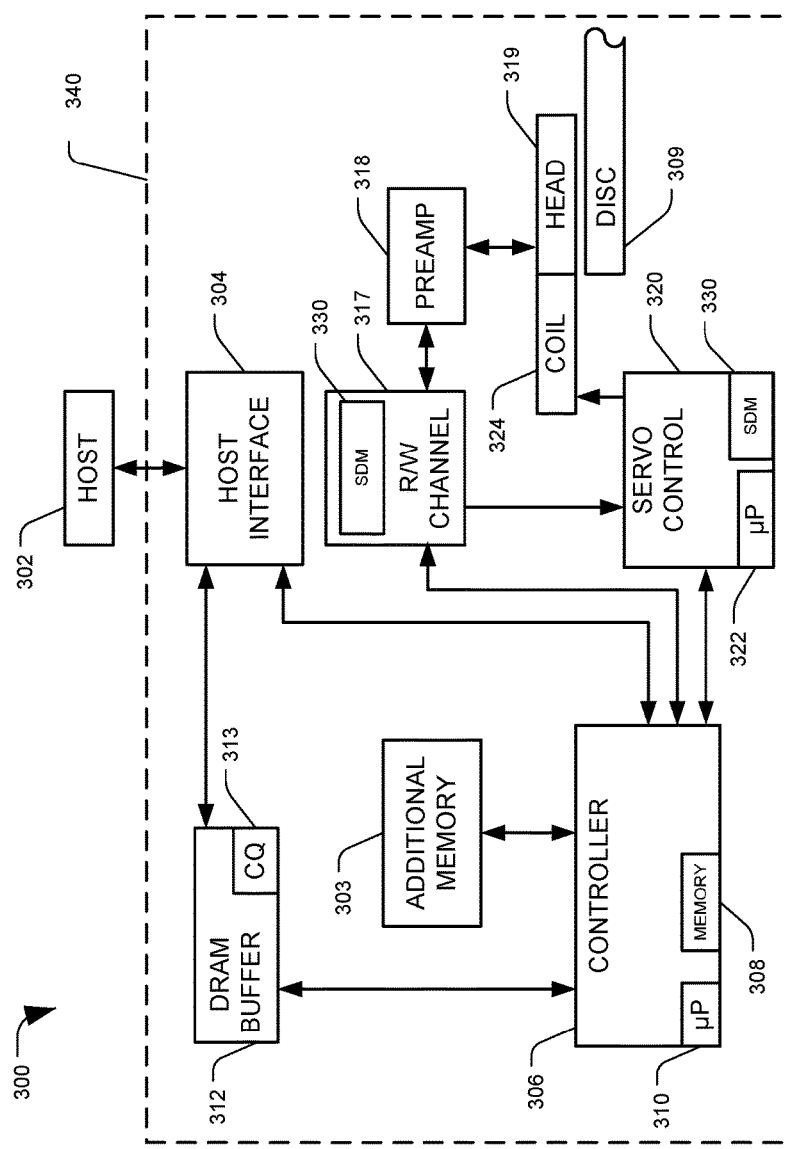
FIG. 3 is a diagram of a system configured to perform servo sector detection, in accordance with certain embodiments of the present disclosure.

FIG. 3 is a diagram of a system configured to perform servo sector detection, generally designated 300, in accordance with certain embodiments of the present disclosure. Specifically, FIG. 3 provides a functional block diagram of an example data storage device (DSD) 300. The DSD 300 can communicate with a host device 302 (such as the host system 202 shown in FIG. 2) via a hardware or firmware-based interface circuit 304. The interface 304 may comprise any interface that allows communication between a host 302 and a DSD 300, either wired or wireless, such as USB, IEEE 1394, Compact Flash, SATA, eSATA, PATA, SCSI, SAS, PCIe, Fibre Channel, Ethernet, or Thunderbolt, among others. The interface 304 may include a connector (not shown) that allows the DSD 300 to be physically removed from the host 302. The DSD 300 may have a casing 340 housing the components of the DSD 300, or the components of the DSD 300 may be attached to the housing, or a combination thereof. The DSD 300 may communicate with the host 302 through the interface 304 over wired or wireless communication.

The buffer 312 can temporarily store data during read and write operations, and can include a command queue (CQ) 313 where multiple pending operations can be temporarily stored pending execution. Commands arriving over the interface 304 may automatically be received in the CQ 313 or may be stored there by controller 306, interface 304, or another component.

The DSD 300 can include a programmable controller 306, which can include associated memory 308 and processor 310. The controller 306 may control data access operations, such as reads and writes, to one or more disc memories 309. The DSD 300 may include an additional memory 303 instead of or in addition to disc memory 309. For example, additional memory 303 can be a solid state memory, which can be either volatile memory such as DRAM or SRAM, or non-volatile memory, such as NAND Flash memory. The additional memory 303 can function as a cache and store recently or frequently read or written data, or data likely to be read soon. Additional memory 303 may also function as main storage instead of or in addition to disc(s) 309. A DSD 300 containing multiple types of nonvolatile storage mediums, such as a disc(s) 309 and Flash 303, may be referred to as a hybrid storage device.

The DSD 300 can include a read-write (R/W) channel 317, which can encode data during write operations and reconstruct user data retrieved from a memory, such as disc(s) 309, during read operations. A preamplifier circuit (preamp) 318 can apply write currents to the head(s) 319 and provides pre-amplification of read-back signals. In some embodiments, the preamp 318 and head(s) 319 may be considered part of the R/W channel 317. A servo control circuit 320 may use servo data to provide the appropriate current to the coil 324, sometimes called a voice coil motor (VCM), to position the head(s) 319 over a desired area of the disc(s) 309. The controller 306 can communicate with a processor 322 to move the head(s) 319 to the desired locations on the disc(s) 309 during execution of various pending commands in the command queue 313. The DSD 300 may have two distinct channels for processing data sectors and servo sectors (e.g. a data channel and a servo channel), although in some embodiments a single channel may be used for both types of signal processing, or certain components may be shared by both channels. For example, the preamp 318 and R/W channel 317 may include components used when processing servo data, and the servo control 320 may also include components of the servo channel and perform servo signal processing.

DSD 300 may include a servo detection module (SDM) 330. The SDM 330 may perform the methods and processes described herein to detect a servo sector, which may include adjusting sampling phase and signal amplitude. The SDM 330 may be a processor, controller, or other circuit, or it may be a set of software instructions that, when executed by a processing device, perform the functions of the SDM 330. In some embodiments, the SDM 330 may be part of or executed by R/W channel 317, part of or executed by servo control circuit 320, included in or performed by other components of the DSD 300, a stand-alone component, or any combination thereof. Additional details on a disc memory 209 and related signal processing are discussed in regard to FIG. 4.

Figure 4:
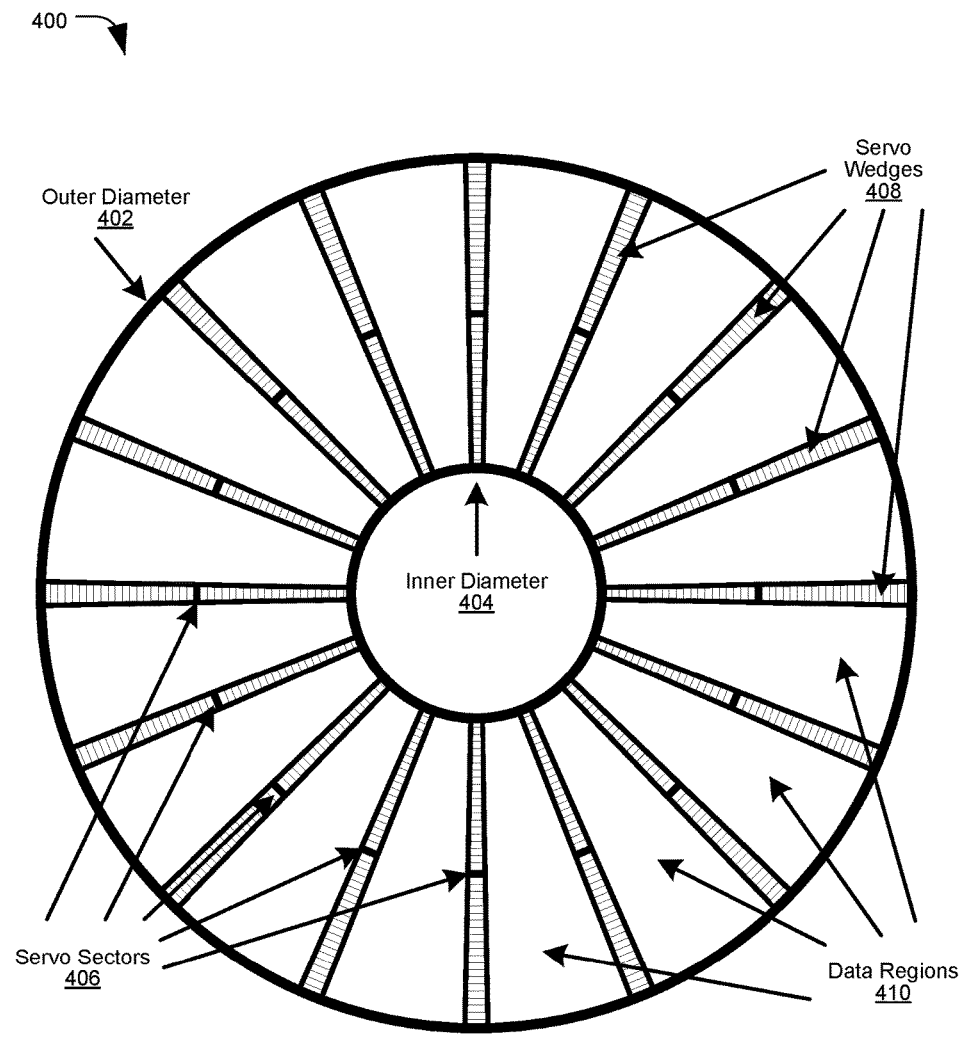
FIG. 4 is a diagram of a system configured to perform servo sector detection, in accordance with certain embodiments of the present disclosure.

FIG. 4 is a diagram of a system configured to perform servo sector detection, in accordance with certain embodiments of the present disclosure. In particular, FIG. 4 depicts servo data recorded to a hard disc 400. The disc 400 may have data recorded to a multitude of concentric circular or spiral data tracks arranged from an outer diameter 402 to an inner diameter 404 of the disc 400. The disc 400 may spin about a central spindle located at the center of the disc 400. A read or write head may be positioned above the surface of the disc 400, and can read or write data to the tracks while the disc 400 spins below the head.

The storage and retrieval of data from a hard disc drive may be made possible by the demodulation of a servo pattern which is written to the surface of each disc 400 during manufacturing. As shown in FIG. 4, the surface of the hard-disc platter 400 may be written with a multitude of servo wedges 408, spanning from the inner diameter 404 to the outer diameter 402, positioned at regular intervals around the disc's circumference. Each servo wedge 408 can include a plurality of servo sectors 406. The servo sectors 406 may define concentrically written tracks, where each track's path may be identified by a multitude of servo sectors 406 written at an (approximately) equal radius and spaced uniformly around the disc 400 (e.g. a track may be composed of all sectors with an equivalent track ID (TID)). An example track may be defined by the servo sectors 406 shaded black in FIG. 4, all at approximately the same radial distance from the center of the disc 400. Data, such as user data and system data which can be written and updated, may be stored to portions of the concentric tracks in the data regions 410 located between each servo wedge 408. While the disc 400 spins below a read head, the head may follow a track and detect a recurrent sequence of a servo sector 406 followed by one or more data sectors within the data region 410, followed by another servo sector 406 and so on.

These servo wedges 408 may be of critical importance to the reliable storage and retrieval of data. The data contained within each servo sector 406 may specify its physical radial and tangential location on the disc 400. As the read head passes over each servo sector 406, the servo sector's information may be demodulated such that the position of the read head is always known to the hard-disc controller (HDC, such as the servo control 320 or controller 306 of FIG. 3), and the position of the write-head may also be inferred. During normal operation, the formatter may have knowledge of the relative position of the next servo wedge 408 to the read head and, thus, may be able to assert a servo gate (a control signal that allows reading of servo patterns and prevents data writes that may overwrite the servo data) synchronously with the written servo data pattern. The read-back signal under servo gate may be applied to a system known as the servo channel (e.g. channel 100 of FIG. 1), which demodulates the contained data and provides it to the hard-disc controller. Using this information, the HDC may be able to position the read/write head over any location on the disc to carry-out all required disk operations. Furthermore, the measured spacing between servo sectors 406 can be utilized to modulate the frequency of clocks used for all write and read operations such that the frequencies remain consistent relative to the rotational velocity of the disc 400. It is this processing of the servo pattern which allows for consistent writes and reliable reads from a hard disc drive.

Figure 5:
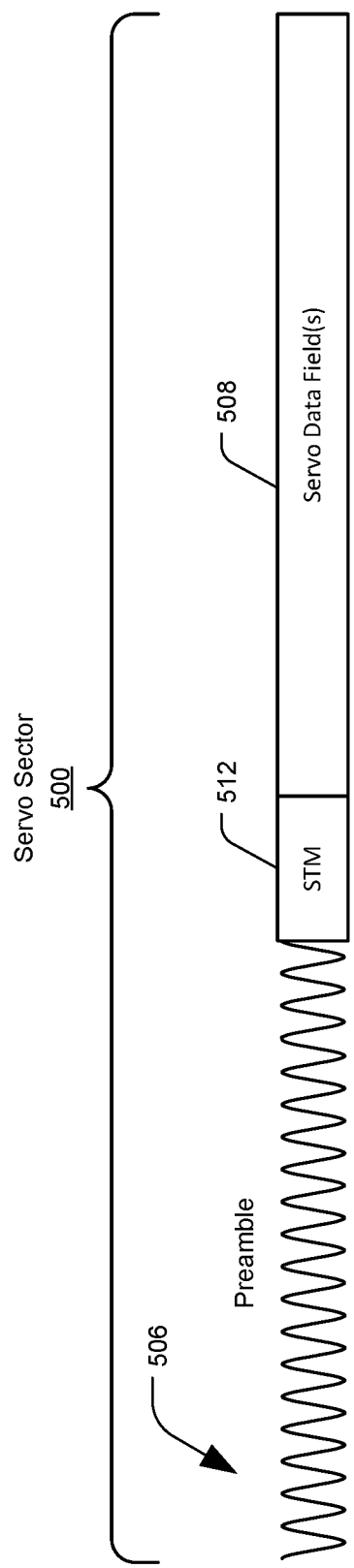
FIG. 5 is a diagram of a system configured to perform servo sector detection, in accordance with certain embodiments of the present disclosure.

At certain times in the operation of a hard-disc drive the relative location of the read head to the next written servo sector 406 may not be known to the formatter. This could be the case, for example, when the disc first spins-up or when the active read head is changed. Here, the HDC can configure the servo channel into a state referred to as 'search mode,' in which the servo channel attempts to locate any servo wedge 408 on the disc 400. Once a servo wedge 408 is located, the formatter may infer the location of subsequent servo wedges 406 and, thus, search mode may be exited and normal operation begun or resumed. This disclosure addresses reliable implementations of search mode operations. FIG. 5 provides an example depiction of a servo sector from a track of the disc 400.

FIG. 5 is a diagram of a system configured to perform servo sector detection, in accordance with certain embodiments of the present disclosure. In particular, FIG. 5 depicts a portion of an example servo sector 500 from a track of a hard disc.

As shown, the sector 500 begins with a preamble field 506, which may be a predefined or selected data pattern that can be recognized to indicate the beginning of a sector. For example, the preamble 506 may be written with an alternating pattern of magnetizations which, when read, generates a sine-wave like read-back signal. The servo gate may be asserted over this field, and the samples obtained from this portion of the read signal may be utilized to conduct both timing and gain recovery. This process may act to condition the signal, by appropriately adjusting the sampling phase and the signal amplitude to match expected values (e.g. the system may have an expected sampling phase at which the signal from the track is to be sampled, and may adjust the sampling phase at the channel to match the expected sampling phase). Conditioning the signal in this manner may allow for the subsequent detection of the servo timing mark (STM) pattern 512. The detection of the STM sequence 512 can be of critical importance to demodulation of the servo sector 500, as all of the servo data fields 518 that follow the STM 512 may be written with a known relation to the STM pattern. As such, detection of the STM 512 may be used as the criteria to declare that a servo wedge has been successfully located while in search mode. The data portion 508 of the servo sector 500 may include information identifying a location of the servo sector 500 (and hence the location of the head reading the sector), and other information used to center a head or otherwise notify or influence the servo control system.

In normal operation ('normal mode', when the locations of the servo wedges and the system's head have been determined, and normal read and write operations to data sectors can be performed), the servo gate may be asserted with a known relation to the written STM pattern 512 (to within a small margin of error). As a result, the search for STM 512 may be relegated to a small window around its expected location. In search mode, however, the search for STM 512 could, conceivably, encompass the entire surface of the disc. This can increase the probability of falsely detecting a servo timing mark 512, since the servo detection procedure is processing many more samples from portions of the disc that would never be considered in normal mode (e.g. it is being run over data sectors). False detection of STM 512 may be extremely undesirable here, as it can cause the formatter to incorrectly synchronize with a non-servo pattern, potentially causing errors and failure to locate an actual STM 512, and therefore a failure to successfully exit search mode and begin normal operations.

A possible approach to avoid false STM 512 detection may be to use a stricter criterion for detection of STM 512 (e.g. only an STM detection deemed of be of high reliability is reported as a successfully detected servo sector 500). Although this may reduce the probability of false STM 512 detection, it may also increase the probability of not detecting an STM, delaying or preventing the successful completion of search mode. As the storage and retrieval of data from an HDD may not be possible while in search mode, search mode should be exited as expeditiously as possible. This may be further exacerbated as the sampling frequency utilized by the channel during search mode may be offset from its desired value, due to the lack of operation during search mode of a servo block known as a disc-locked clock (DLC). The DLC may act to lock the clock frequency to the rotational velocity of the disc; however, it may not be operated while in search mode. As a result, it may not be possible to detect an STM 512 with high reliability and, thus, adopting a strict STM 512 detection criterion may lead to the inability to exit search mode.

An alternative search mode methodology, which may be implemented via a servo detection module (STM), may first rely on the successful detection of the servo preamble 506 before attempting a detection of STM 512. By doing so, the STM search can be focused only on locations of the disc which are likely to contain an STM 512. Once preamble 506 is successfully detected, phase and amplitude parameters can be extracted from the detected preamble and utilized to setup the STM 512 detection parameters. As the search proceeds, these parameters may be continually updated to keep them current, which may be particularly important when a frequency offsets is present, thus increasing the probability of a successful detection. The proposed methodology possesses two important figures-of-merit that an effective search mode procedure should possess: a high probability of correctly detecting a present STM 512, even in the presence of a frequency offset, and a low probability of false STM detection. In possessing both of these attributes, the proposed methodology is able to quickly and reliably locate an STM 512 such that search mode may be exited as expeditiously as possible.

As described above, although some of the examples being discussed are in the context of a servo identification method, the techniques described are not limited to this embodiment. Detecting the presence of a single tone (e.g. sine-wave) embedded into a sequence of written or transmitted data, followed by an identifying data sequence (similar to the STM) is an operation that can be conducted by digital receivers. The described systems and methods may be utilized in any application that utilizes such functionality. An overview of the proposed methodology is discussed in regard to FIG. 6.

Figure 6:
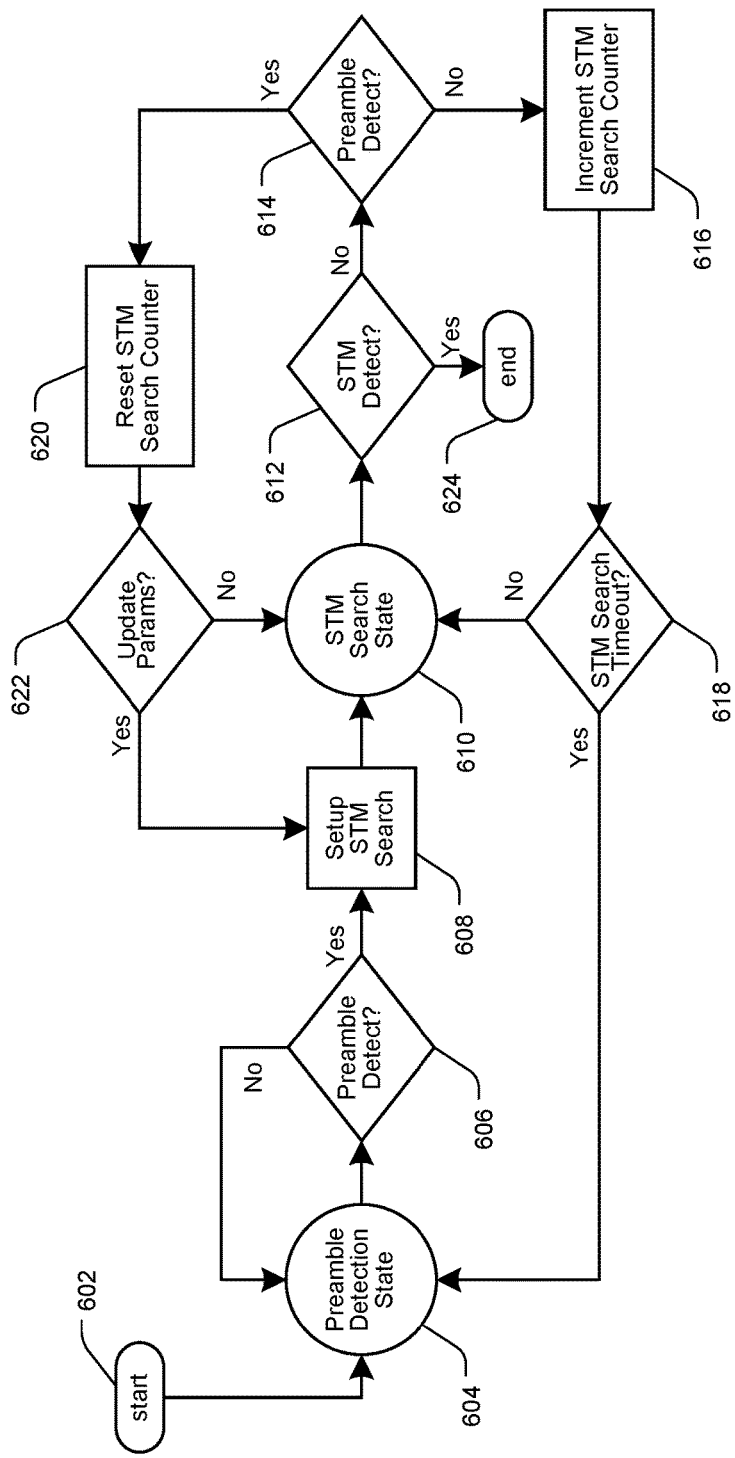
FIG. 6 is a flowchart of an example method of servo sector detection, in accordance with certain embodiments of the present disclosure.

FIG. 6 is a flowchart of an example method 600 of servo sector detection, in accordance with certain embodiments of the present disclosure. The method 600 may correspond to a search mode performed at a receiving device to detect an STM or other selected signal pattern within a received signal, for example using a servo detection module (SDM).

FIG. 6 provides a high-level depiction of the servo sector detection methodology, which may have two basic states of operation: a preamble detection state and an STM search state. The method 600 may start at 602, with initiating a servo sector search mode, for example in response to a disc storage medium first spinning up. The method 600 may then include initiating the preamble detection state, at 604, in which samples taken from a received signal are continually applied to a preamble detect block. The preamble detect block may be a component of the servo detection module configured to detect the presence of the preamble pattern that precedes servo sectors. An applicable example methodology to detect a servo preamble is described in U.S. Pat. No. 9,819,456, the contents of which are hereby incorporated in their entirety, although other methods of detecting servo preamble may also be used.

A determination may be made whether a preamble is detected, at 606, for example based on whether a proportion of most recent samples correspond to a preamble pattern. If not, the method 600 may include continuing to operate in the preamble detection state, at 604. Once the preamble detection block is able to affirmatively detect preamble, the method 600 may include setting up the system parameters so as to enable the detection of STM, at 608. Setting up the parameters may include adjusting the signal amplitude, adjusting a sampling phase, or setting other parameters which may facilitate the detection of the STM from the signal.

Once the system parameters are set up, the method 600 may include transitioning to the STM search state, at 610. During the STM search state, operations to detect an STM may run while the preamble detection operation continues to operate concurrently. The STM search state attempts to locate the written STM pattern while the preamble detection operation continues the operation of determining whether the applied samples correspond to the servo preamble. A determination may be made whether the STM was detected, at 612. If so, the method 600 may end, at 624, with the system reading the data from the servo sector and determining a head location and orienting the system with the timing for the next servo wedge.

If the STM is not detected, at 612, a determination may be made whether the preamble is still detected, at 614. For example, the received signal may still correspond to the preamble, meaning the read head has not yet reached the STM. To avoid excessively long STM searches, the STM search state may have a corresponding limited search window or time limit (or limit based on other factors, such as a sample counter). If the STM is not located within the time limit, STM search state may end. Successful requalification of servo preamble, however, (e.g. the system continues to detect preamble while searching for the STM) may act to extend this timeout window and, under certain conditions, an update of the STM detection parameters may be made.

Accordingly, if the preamble is not still detected, at 614, the method 600 may include incrementing the STM search counter 616, thereby reducing the remaining time to locate the STM before STM search mode is exited. A determination may be made if the STM search timeout threshold has been reached, at 618. If not, the method 600 may include continuing to search for the STM in the STM search state, at 610. If the STM search timeout threshold has been reached, STM search state may be exited and the system may continue search mode in only the preamble detection state, at 604.

If the preamble is still detected during the STM search state, at 614, the method 600 may include resetting the STM search counter at 620, thereby extending the STM search state timeout threshold. Extending the STM search timeout may be performed by resetting the STM search counter (e.g. set back to 0 each time preamble is requalified) or by adjusting the timeout threshold (e.g. not resetting the STM search counter, but increasing the value of the timeout threshold). A determination may be made whether to update the system's search parameters, at 622. For example, based on the characteristics of the most recent samples, updating the parameters based on those samples may improve or degrade the system's ability to detect the STM. If a determination is made not to update the parameters, the method 600 may include continuing to run the STM search state with the existing parameters, at 610. If, however, a determination is made at 622 to update the parameters, the method 600 may include performing the STM search state setup at 608 to adjust the parameters based on recent sample values.

Whether STM search mode expires at 618 or is extended at 620, the method 600 may continue until either a falling edge of servo gate or a successful STM detection event. Normally the servo gate may remain in a high (or "asserted" or "on") state until STM is found, although the system may deassert the servo gate and reset the harderware if it is taking too long to locate the STM, and then retry by reasserting the servo gate. Further details on the method 600 are provided below. Example details of parameter generation, as in step 608, is discussed in regard to FIG. 7.

Figure 7:
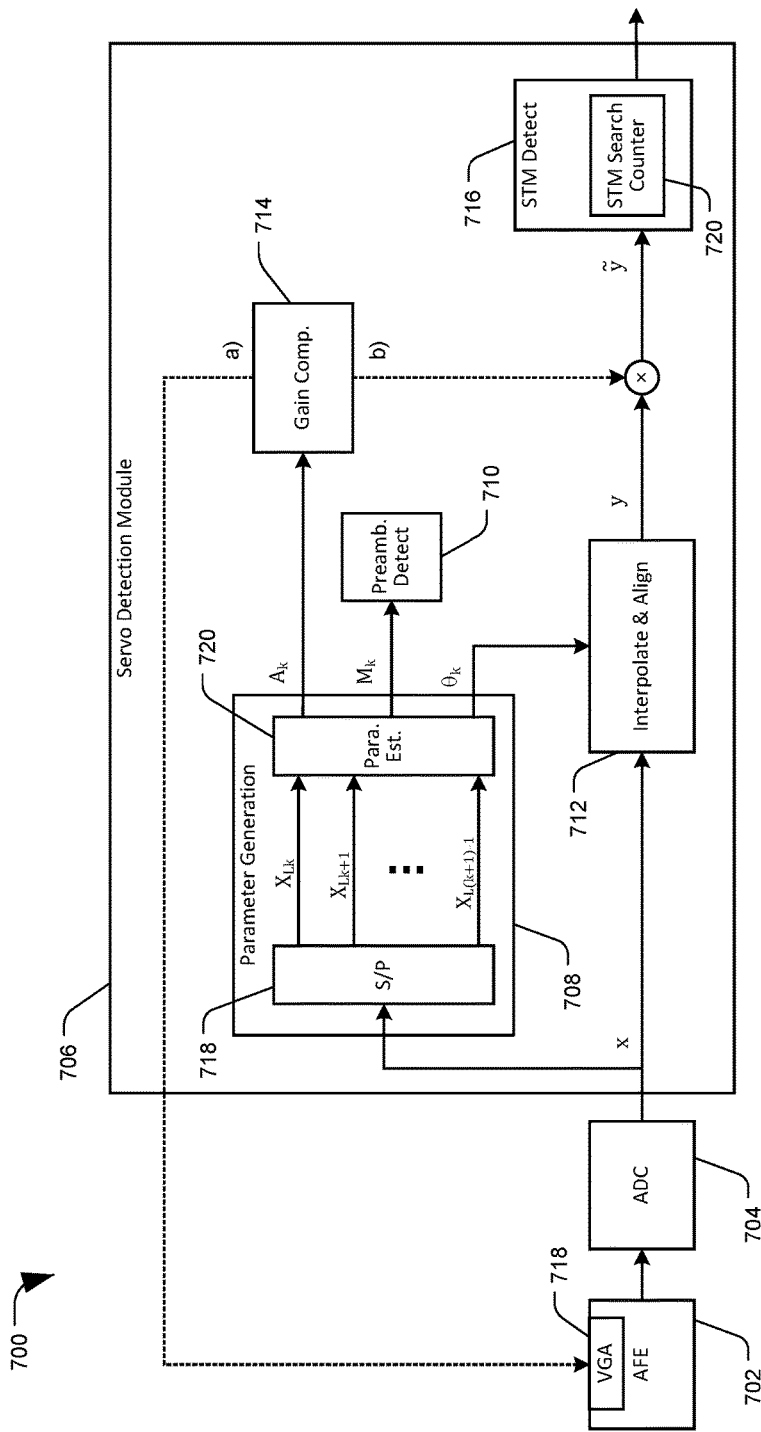
FIG. 7 is a diagram of a system configured to perform servo sector detection, in accordance with certain embodiments of the present disclosure.

FIG. 7 is a diagram of a system configured to perform servo sector detection, generally designated 700, in accordance with certain embodiments of the present disclosure. In particular, FIG. 7 depicts a portion of a channel, such as the channel 100 of FIG. 1.

As with channel 100 of FIG. 1, system 700 may include an analog front end (AFE) 702 to condition a received signal, and an analog to digital converter (ADC) 704 to sample the signal. The ADC 704 may provide a stream of samples x to the servo detection module (SDM) 706. The SDM 706 may perform operations such as those outlined in method 600 to detect a servo sector, including performing a preamble search, setting parameters for a servo timing mark (STM) search state, and locating the STM based on the samples x and the selected parameters once a preamble is detected. The SDM 706 may include a parameter generation module 708 to generate parameter values to apply, a preamble detect module 710 to determine whether a preamble pattern has been located, an interpolate and align module 712 to adjust a phase of the sampled values, a gain compensation module 714 to adjust the amplitude of the signal or samples, and an STM detect module 716 to identify an STM pattern based on the sample stream after parameter modifications have been applied.

As described, the ADC 704 may provide a stream of samples x to the SDM 706, which may in turn be provided to the parameter generation module 708. Parameter generation may be run continuously throughout the search mode procedure, during both the preamble detection state before a preamble is detected, as well as during the STM search state with concurrent preamble detection operations after preamble is detected. At the parameter generation module 708, the stream of samples x may be grouped into sets of L consecutive samples. A group of L consecutive samples may be a unit referred to as a 'search window', where L may be a multiple of the (integer, S) number of times each preamble cycle is sampled. For example, the system may be configured such that a servo preamble will be sampled approximately four times (S=4) per cycle or period of the sine wave pattern. An example search window may span three preamble cycles, and therefore L=3 cycles×4 samples=12 consecutive samples.

In an example embodiment, the samples x may be grouped into non-overlapping sets of L consecutive samples, for example via a serial-to-parallel (S/P) circuit or module 718. The S/P circuit 718 may receive a stream of L samples in serial and then output the L samples simultaneously in parallel. In another example embodiment, a sliding window approach may be used instead of non-overlapping windows, where new samples are "shifted in" to the window. For example, if one new sample was shifted in define the next window, window k may include L samples $x_0$ through $x_{N-1}$, while window k+1 may include L samples $x_1$ through $x_N$, with old sample $x_0$ shifted out and new sample $x_N$ shifted in, and so on.

The S/P circuit 718 may apply the L samples to a parameter estimation module 720, which may process the samples to generate the following three output values:
1. $\theta_k$: An estimate of the phase ($\theta$) at which the preamble is being sampled.
2. $A_k$: An estimate of the amplitude (A) of the preamble.
3. $M_k$: A metric that indicates the similarity of the samples to those expected for a servo preamble (e.g. an error value or metric).

Generating an estimate of the phase $\theta_k$ and amplitude $A_k$ of a sine-wave pattern given its samples may be performed according to known methods. The phase and amplitude values may only be valid when the constituent samples of a given search window are, indeed, that of a servo preamble, and thus they may only be used when a determination has been made that a servo preamble is detected. Methods for generating a metric $M_k$, which may be indicative of a search window's samples being that of a servo preamble, may be performed using various methods. Example methods of generating an error metric which may be applied to the current methodology is disclosed in U.S. Pat. No. 9,819,456 as incorporated herein.

Figure 8:
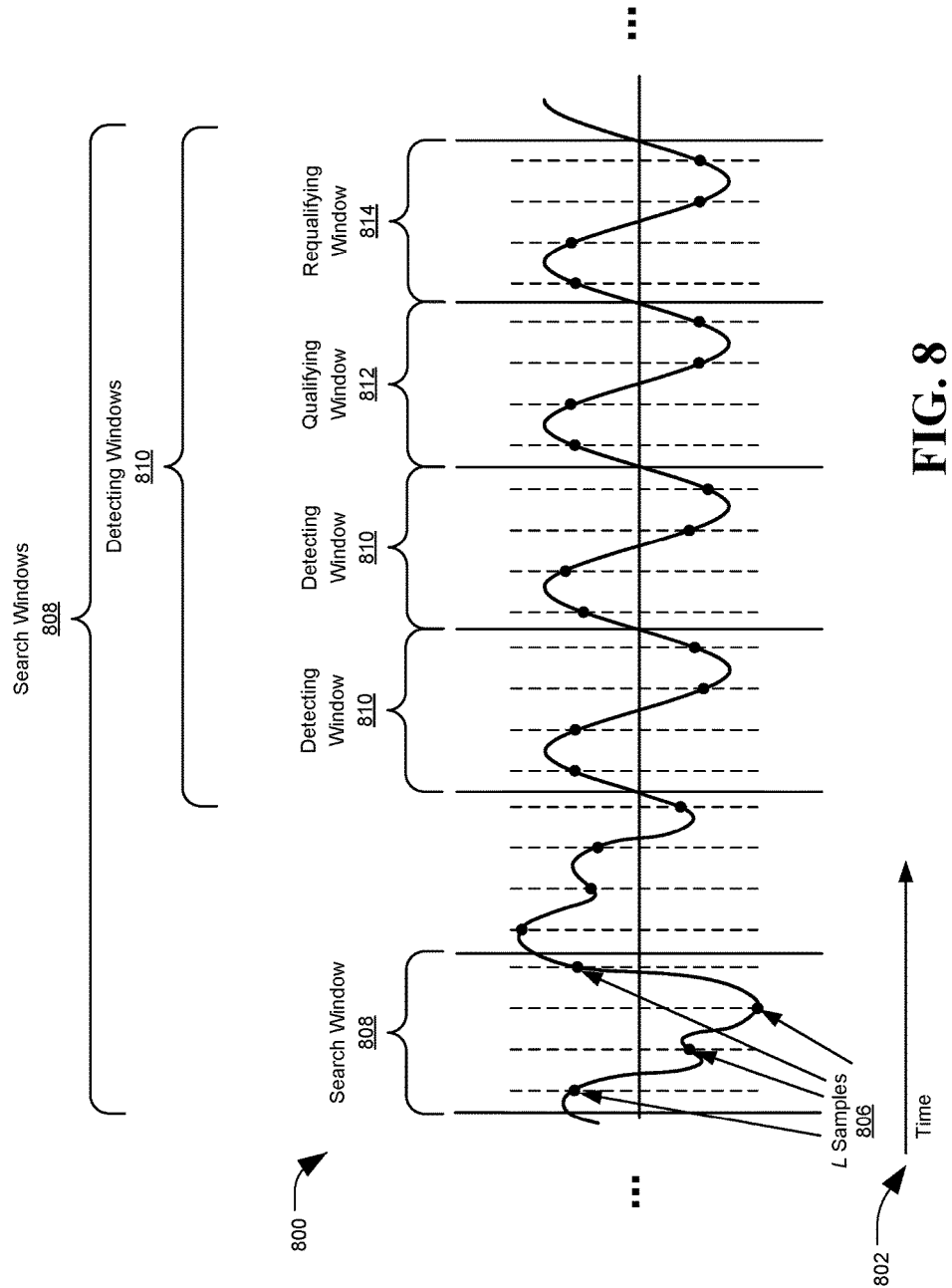
FIG. 8 depicts a diagram of a signal pattern, in accordance with certain embodiments of the present disclosure.

The system 700 may start in a preamble detection state, in which the SDM 706 attempts to locate a servo preamble pattern in the signal. During the preamble detection operations (which may occur during the preamble detection state, and may continue when the system shifts to the STM search state until a servo timing mark is located, a sequence of the metric values $M_k$ may be provided to a preamble detect block 710, which may monitor the metric values to determine whether the samples from the corresponding search window match the expected pattern of a servo preamble. Here, each value of $M_k$ may be compared to a specified threshold, and a favorable comparison (this could be larger than or smaller than the specified threshold depending on the implementation) indicates an affirmative detection of preamble. FIG. 8 will be used to illustrate an example preamble qualification process during the preamble detection state.

FIG. 8 depicts a diagram of a signal pattern 800, in accordance with certain embodiments of the present disclosure. A procedure for sampling the signal 800 to obtain sample values, and detect preamble based on the sample values, is described. Signal pattern 800 may be received at an ADC in the form of a continuous voltage quantity received over a time period 802. The ADC may "sample" the signal 800 to obtain sample values 806 representing the state of the signal 800 at the point in time when the signal 800 was sampled. Each dashed line may represent a clock signal triggering a sampling by the ADC, with the black dots representing the sample points 806 and values. A set of L consecutive samples 806 may be grouped into a search window 808. In the depicted embodiment, L=4 samples.

The method for detecting a preamble may include generating a metric $M_k$ for each search window 808, which may be used to determine if the samples 806 from the search window 808 are, indeed, samples of a preamble sequence. For example, this may be accomplished by determining an error value for each search window 808 representing a deviation of the samples from an expected signal pattern of a preamble. If the error value for a group is lower than a threshold value, then a determination may be made that the samples from that group correspond to the expected preamble signal pattern.

Each search window 808 that affirmatively detects preamble may be referred to as a 'detecting window' 810. In the depicted example, the first and second search windows 808 along the timeline 802 contain random signal patterns that may not correspond to a preamble pattern, while the detecting windows 810 may include signal patterns approximately corresponding to a servo preamble sine wave. Although a single detecting window 810 could be the used as the criterion to declare the presence of preamble, the probability of false preamble detection (for any utilized metric $M_k$ and threshold) may be unavoidably non-zero. The probability of falsely detecting preamble may be made arbitrarily low, however, by requiring multiple of the most recent search windows 808 to be detecting windows 810 to declare preamble detected. More generally, for specified values m and n, an affirmative detection of servo preamble may be declared when m of the previous n search windows 808 are detecting windows 810. We refer to the search window 808 that triggers declaration of a preamble as the qualifying window 812 (note that a qualifying window 812 is also be a detecting window 810). In the depicted example, m=3 and n=4, so that when three of the previous four search windows 808 are detecting windows 810, preamble may be declared, with the third detecting window 810 being the qualifying window 812. In some embodiments, m=n, such that the last n search windows 808 must all be detecting windows 810 in order to declare preamble. A qualifying window 812 may cause the transition from the preamble detection state to the STM search state.

Returning to FIG. 7, an example process for the STM search state will be described. The operation of the preamble detection state may be invariant to sampling phase; however, this may not be the case for the STM search state. Detecting STM in a sampled data system may be improved by setting the sampling phase to a known selected value. In general, the desired sampling phase may be referenced to the phase of the preamble, and an estimate of the current sampling phase $\theta_k$ may be generated by the parameter estimation module 720 for every search window processed. The phase estimate from the qualifying window (which may be denoted as $\theta_Q$) may be applied to an "interpolate & align" module 712, which can achieve the desired selected sampling phase through a combination of sample realignment and digital interpolation. For example, in some embodiments the written preamble pattern may be sampled S=4 times per period and, therefore, $2\pi$ radians spans four sampling periods (or 4 T). If the qualifying window's phase estimate is $\theta_Q = \pi/8$ radians and the desired sampling phase is $3\pi/2$ radians, the sampling phase may require an adjustment of $(3\pi 2 - \pi/8) = 11\pi/8$ radians (or, equivalently, an advance in sampling phase of 44/16 T=2.75 T). Rectifying this misalignment may be done in a number of equivalent ways. One possibility would be to drop 2 samples (e.g. skip over the next two samples) and use a digital interpolation filter to advance the sampling phase by 0.75 T, whereas another option would be to drop 3 samples and use a digital interpolation filter to move the sampling phase back by 0.25 T. Due to the repeating nature of phase, adding or subtracting any integer multiple of $27\pi$ radians (or 4 T) yields an equivalent sampling phase and, therefore, there are an infinite number of possibilities in this regard. In general, a policy may be adopted in which any phase estimate in the interval $[0.2\pi]$ would be mapped to an operation which appropriately sets the sampling phase. More discussion on phase adjustment will be provided below.

In addition to sampling phase adjustment, in systems in which the signal amplitude is not well-controlled, an amplitude adjustment may also be performed to allow for the reliable detection of STM (if the signal amplitude is well-controlled, this step may be rendered unnecessary). As was the case for sampling phase, the desired selected signal amplitude may generally be referenced to the preamble amplitude and, therefore, the amplitude estimate from the qualifying window ($A_Q$) may be utilized for the amplitude adjustment. When preamble is detected, the parameter generation module 708 may apply the amplitude estimate for the qualifying window $A_Q$ to a gain compensation module 714, which may determine an amplitude adjustment to achieve the selected signal amplitude.

From here, FIG. 7 depicts two example possibilities for amplitude adjustment or compensation. In possibility a) the amplitude estimate may be used to adjust a digital control to a variable gain amplifier (VGA) module 718 in the Analog Front-End (AFE) 702. Here, the deviation from the desired amplitude may be used to apply a small correction to the VGA 718 control code or a "one-shot" adjustment may be conducted to attempt an instantaneous correction of the signal gain. Conversely, in possibility b) the amplitude correction may be handled digitally. The signal 'y' output from the interpolate and align module 712 (which may be in the form of a sequence of phase-adjusted sample values based on samples x and the qualifying window phase estimate $\theta_Q$) may be scaled by a value equal to the desired amplitude divided by the estimated amplitude, producing signal having an adjusted amplitude. With either approach a) or b), the signal gain may be appropriately adjusted.

Once the phase (and possible gain) adjustment is made to condition the signal, the resulting samples (e.g. samples following those belonging to the qualifying window) may be applied to an STM detection module 716. Here, a counter may be maintained (e.g. an STM search counter 720) to limit the STM search to a predetermined number of samples following the detection of servo preamble, as excessively long searches may increase the probability of false STM detection. If the counter 720 reaches a selected STM search timeout value or threshold, the STM search may conclude and the system may transition back to the preamble detection state. If an STM is successfully detected at any point in the allotted timeframe, referred to as the STM search window, the STM detect module 716 may generate a signal or other indication that the STM has been detected, and search mode may conclude. Once an STM is detected, the system may be able to read the servo positioning information from the servo sector to identify a head location, and may then be able to locate and read subsequent servo sectors without the need to perform a servo search mode again until the disc spins down or the active read-head is changed.

The process as described above may be easily utilized when the preamble length for all servo sectors is known. For example, if L=16 (samples) for non-overlapping search windows and every servo preamble is of length 80 T, then it is guaranteed at least four search windows will contain only samples of servo preamble as each servo sector is processed (since the alignment of the search windows to the written preamble pattern is not known, it is also possible, but not guaranteed, that five search windows will contain only preamble samples). As such, a setting of n=m=4, for example, would work well. In practice, however, the length of any given written servo preamble may not be known, and may vary from sector to sector. As data sector writes may infringe on written servo sectors, the length of any given preamble may even change over the lifespan of a hard-disk drive. However, knowing a minimum written preamble length may be sufficient, as knowledge of this value may be relied upon for normal operation of the servo channel.

In light of this, the parameters of search mode may be set to accommodate the shortest written preamble that may be encountered. If this is not the case (e.g. using n=m=6 in the above example) then shorter preambles may go undetected. This can elongate the process of finding a valid STM and, in the worst case, search mode may fail entirely if all preambles in the region of the disc currently being searched are not accommodated by the utilized parameters.

When utilizing parameters that accommodate shorter preambles, longer written preambles may become problematic. When longer preambles are encountered, initial preamble qualification may take place at the start of the preamble, well before the STM is sampled. In such a case, the STM search window may expire before the STM is encountered, causing the STM search state to fail. To account for this, a larger STM search window could be utilized. However, longer STM searches can increase the probability of false STM detection and, thus, may not be desirable. Furthermore, since the sampling clock may not be synchronized to the rotation of the disc in search mode, inconsistencies between the sampling frequency and the written pattern frequency can cause the estimated phase from the qualifying window to quickly become deprecated, and may cause the STM to go undetected (e.g. the parameters derived from the qualifying window near the start of the preamble may no longer prove accurate by the end of the preamble when the STM would be encountered). Alternatively, the STM search window length could be set to a smaller value which, for longer preambles, will cause the system to repeatedly transition between the preamble detection state and the STM search state as the STM search window repeatedly times out and preamble is requalified. Although this does solve the false detection and phase deprecation issues, this process may contain "blind-spots," as STM may not be detected while in the preamble detection state. All of these difficulties may be obverted by allowing for requalification of the preamble without exiting the STM search state.

Requalification will be addressed by returning to FIG. 8. As parameter generation continues to be run in the STM search state, a determination may be made for each search window 808 processed if m of the previous n search windows 808 are detecting windows 810, a condition which triggers requalification. A search window 808 that causes the preamble to be requalified during the STM search state may be referred to as a requalifying window 814. In the depicted embodiment 800, m=3 and n=4, such that three consecutive detecting windows 810 triggers preamble qualification, with the third detecting window 810 being the qualifying window 812. STM search mode may then be initiated. If the next search window 808 following the qualifying window 812 is also a detecting window 810, then that search window may re-qualify the preamble and become a requalifying window 814.

In its simplest form, all such requalifying windows 814 can act to extend the STM search window. This may be accomplished by either, e.g. resetting the STM search counter or by increasing the STM search timeout value by an amount equal to the number of clock cycles since the last successful qualification (which may either be the initial qualification or the previous requalification). For either implementation, a requalification should cause the STM search window to end in the same location as it would have had the requalifying window 814 been the initial qualifying window 812. In alternate embodiments, each successive requalification may extend the STM search window by a smaller amount, to avoid potential errors of a written pattern similar to the preamble causing excessively long STM search state renewals.

Although requalification may allow for a shorter STM search window to be utilized (since the STM search window can be repeatedly extended in the case of a longer written preamble), it does not address the issue of parameter deprecation from the qualifying window 812. To address this, the utilized phase estimate ($\theta_Q$) (and possibly the utilized amplitude estimate $A_Q$) could be updated using those generated from the samples in the requalifying window 814. There are, however, a few complications with this approach:

A first complication may relate to encountering a boundary between the preamble and the STM within the requalifying window 814. By allowing requalification, it may be assumed that search windows 808 will continue to detect preamble right up to the written STM. As the alignment of the search windows 808 to the written STM pattern may be unknown, it is possible that the final requalifying window 814 prior to STM contains some samples from the STM. This can be particularly true when a setting of m<n is utilized, in which the final requalifying window 814 need not even be a detecting window 808 (e.g. preamble may not even be detected in the requalifying window 814 if m=3 and n=4, so that three detecting windows 808 followed by a non-detecting search window 808 would still qualify for preamble detection). The presence of non-preamble samples in the requalifying window 814 may corrupt the resulting amplitude and phase estimates and, therefore, such an update of parameters may hinder the STM detection procedure. This may be less of a concern with an initial qualifying window 812, as the parameters of initial preamble qualification may be set to account for a shortest expected written preamble, so that it is unlikely that STM samples will be included in the initial qualifying window 812. Returning to a previous example of search window length L=16 samples, and a shortest expected preamble of 80 T, at least four non-overlapping detecting windows 810 can fit entirely within the preamble without encountering the boundary of the STM. Further, the parameters may be set to allow some margin of error (e.g. the first search window 808 entirely within the preamble failing to qualify), such as setting m=n=3 in the above example.

In addition to STM samples within a requalifying window 814 corrupting the search parameters, a second complication from using parameters derived from the requalifying window 814 may include phase wrapping issues. Upon initial preamble detection, the estimated phase ($\theta_Q$) associated with the qualifying window 812 may be utilized to align the sampling phase to the desired sampling phase for application to an STM detection procedure. If this phase is to be updated by requalification, care would need to be taken to avoid potential wrapping effects, which can cause a discontinuity in the generated sample stream applied to STM detection. Wrapping issues can be exacerbated by any frequency offset present as it can cause a linear change in the sampling phase of the read-back signal. Because of STM boundary and phase wrapping difficulties, it may be inadvisable to simply update the parameters each time a search window 808 requalifies the preamble.

The STM boundary issue may be characterized by a corruption of the amplitude, phase estimates, or other parameter estimates generated for a requalifying window 814 due to the presence of STM samples in that window. To assuage this, additional constraints may be applied to a requalifying window 814 to avoid parameter updates from windows that may be affected by such corruption. In one example situation, a requalifying window 814 may contain a significant number of STM samples, such that the servo detect module is unable to detect servo preamble (e.g. the requalifying window 814 is not a detecting window 810). As explained previously, for such a search window 808 to be a requalifying window 814, the system parameters would be set such that m<n. According to the proposed methodology, a parameter update may not be applied unless one of the following two criteria are met:

1. The requalifying window 814 is also a detecting window 810; or
2. All n of the previous search windows be detecting windows (e.g. m is ignored).

It can be seen that criteria 2) is a subset of 1) and, thus, imposes a stricter criterion for parameter updating. However, it may be noted that 2) is more robust when the STM pattern, or the pattern that follows the STM, may contain signal sequences that appear similar to the preamble or its inversion. For example, if m/n=3/4, and the STM includes sequences that are an approximate inversion of the preamble sequence, a potential scenario may arise where the system encounters two detecting windows 810, followed by a non-detecting search window 808 that includes both preamble and STM samples, and then another detecting window 810 due to the improper detection of preamble from the inverted preamble sequence in the STM. This would provide the requisite 3 out of 4 detecting windows 810 to requalify the preamble detection, with the requalifying window 814 also erroneously being a detecting window 810. However, adjusting parameters based on the erroneous final detecting window 810 may provide bad settings that prevent the detection of the actual STM. In this scenario, proposal 1) may fail while proposal 2) may still succeed at detecting STM. Under proposal 2, the parameters from the last valid detecting window 810 may be maintained, allowing the system to correctly detect the STM.

As stated above, if criterion 1) or 2) is not met but the preamble still requalifies (e.g. m<n with the requalifying window 814 not being a detecting window 810), then the parameters from a previous detecting window may still be used, rather than updating them based on the requalifying window 814. On the other hand, with the selected criterion of 1) or 2) met, the requalifying window 814 should also be a detecting window 810; however, it may still contain some samples of STM. A detecting window 810 may be unlikely to contain too many non-preamble samples (or it would fail to register as a preamble sample sequence) and those that it does contain would be toward the end of the search window 808. As such, the parameter generation module may also generate a metric $M_k^e$, which may be computed in the same manner as $M_k$ but only over a selected number of last samples 'P' from the search window 808, where P<L samples. If, for example, the metric $M_k$ is generated as a sum of error values over the search window's 808 constituent L samples, the $M_k^e$ metric may be the same sum but over only the final P samples of the window. The computed metric may then be compared to a threshold (which may or may not be the same as the threshold utilized for $M_k$) to determine its suitability for a parameter update. A requalifying window 814 that adheres to the selected constraint above and has a favorable comparison of $M_k^e$ to the utilized threshold may be referred to as an updating window, and may be utilized to update the parameters. In the embodiment of FIG. 8, the requalifying window 814 may also be an updating window. A flowchart of the overall parameter updating operation is provided in FIG. 9.

Figure 9:
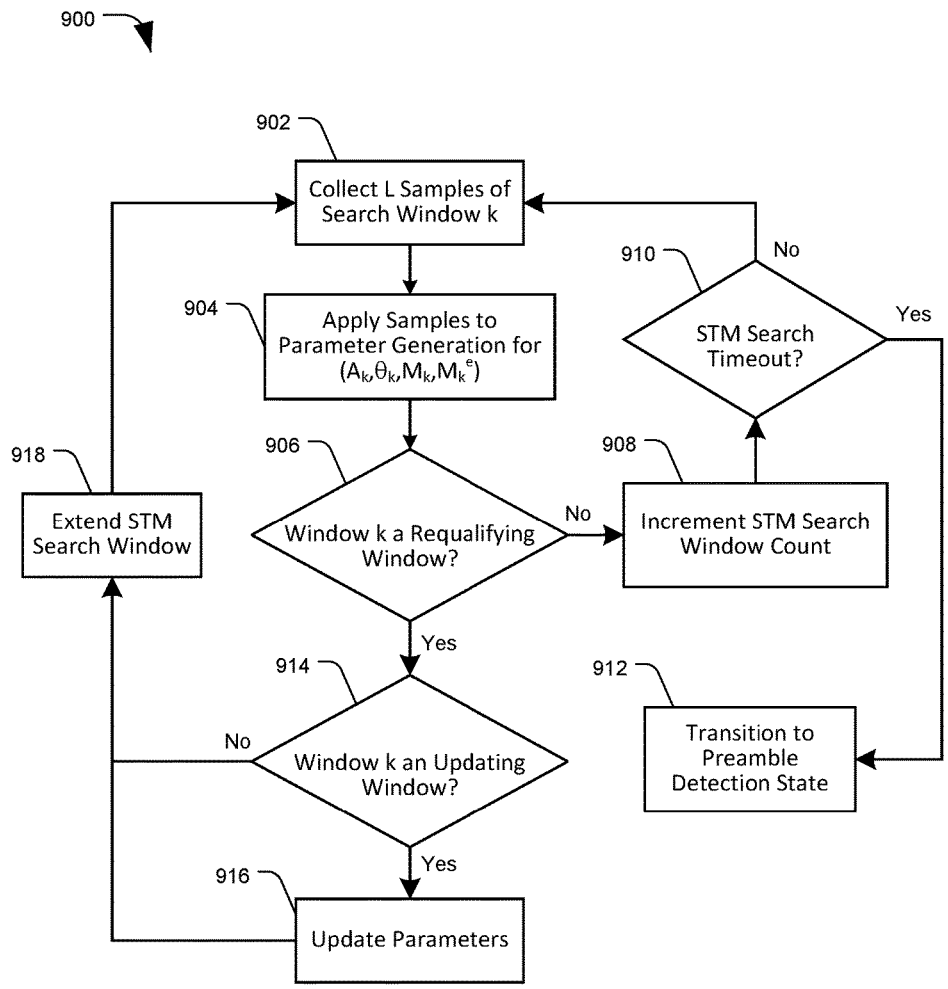
FIG. 9 is a flowchart of a method of servo sector detection, in accordance with certain embodiments of the present disclosure.

FIG. 9 is a flowchart of an example method 900 of servo sector detection, in accordance with certain embodiments of the present disclosure. The method 900 may correspond to a parameter updating process performed when a preamble signal is requalified during an STM search state, and may be performed by servo detection module. That is, preamble may already have been detected, and the system may be searching for an STM while determining whether the preamble is still detected. The STM search window may The method 900 may include collecting the L samples of a search window 'k', at 902. The L samples may be applied to parameter generation, such as for the parameters $A_k$, $\theta_k$, $M_k$, and $M_k^e$, at 904. A determination may be made whether the window k is a requalifying window, at 906. For example, the system may compare the value of $M_k$ to a threshold value to determine whether window k is a detecting window, and then determine whether m of the last n search windows are detecting windows. If not, then k is not a requalifying window, so preamble is no longer qualified (e.g. no longer detected) and the method 900 may include incrementing the STM search window count, at 908. A determination may then be made whether the STM search state has timed out, at 910 (e.g. whether the STM search count has exceeded a threshold count limit). If the STM search has not yet timed out, the method 900 may include collecting L samples for the next search window, at 902, and continuing to search for the STM. Collecting the L samples for the next search window may include gathering L new samples for a non-overlapping search window implementation, or gathering some number of new samples less than L for a sliding window implementation (e.g. adding two new samples and dropping the two oldest samples). If the STM search has timed out, at 910, the method 900 may include exiting the STM search state and transitioning back to the preamble detection state, at 912.

If window k is a requalifying window, at 906, the method 900 may include determining whether window k is also an updating window, at 914. If m out of the last n search windows are detecting windows, but either window k is not a detecting window (e.g. $M_k$ is below a first threshold) or window k is a detecting window but the value of $M_k^e$ is below a second threshold (which may be the same or different from the first threshold), then a determination may be made that window k is not an updating window. In such an event, the method 900 may include extending the STM search window (since the preamble was requalified at 906) without updating any parameters based on window k. On the other hand, if the window k is an updating window, at 914, the method 900 may include updating the parameters based on window k, at 916, and then extending the STM search window, at 918. If at any point the STM is detected, the system may exit search mode entirely.

The additional constraints placed on a requalifying window to allow it to be an updating window may be to remove from consideration search windows containing samples of STM, which may corrupt parameter values. If desired, the amplitude estimate ($A_k$) associated with an updating window may be used to update the selected method of gain compensation. Such an approach may allow for any variation in the amplitude of the signal to be compensated for and, thus, improve the probability of detecting STM. Updating of the phase, however, may be complicated by the phase wrapping issue mentioned above, and thus may require special handling, as detailed below.

Figure 10A:
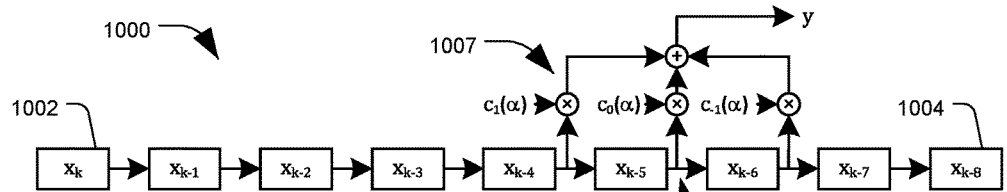
FIGS. 10A, 10B, and 10C are diagrams of a system configured to perform servo sector detection, in accordance with certain embodiments of the present disclosure.
Figure 10B:
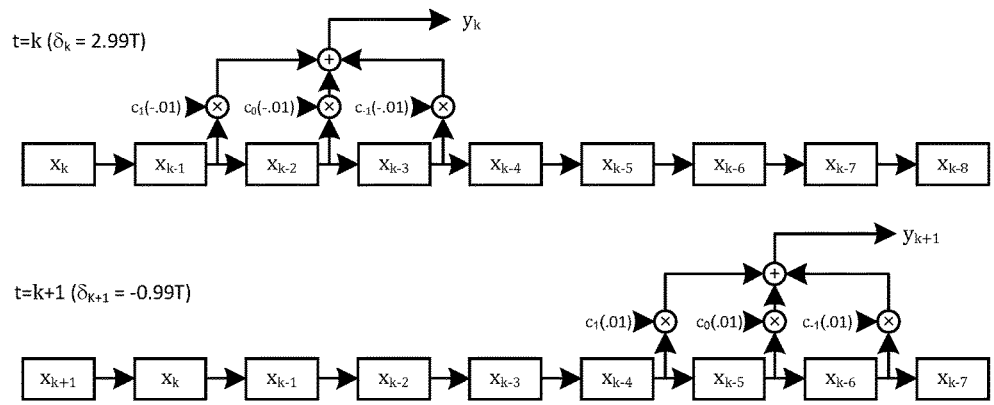
Figure 10C:
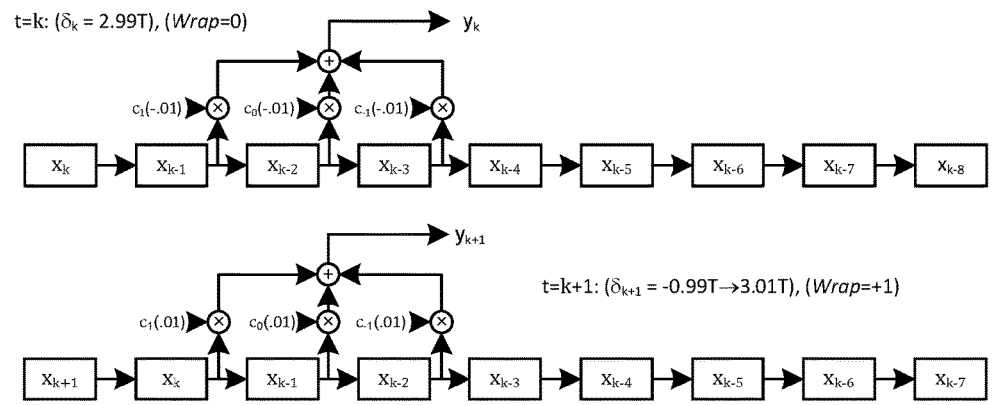

FIGS. 10A through 10C depict diagrams of a system configured to perform servo sector detection, generally designated 1000, in accordance with certain embodiments of the present disclosure. In particular, FIGS. 10A through 10C depict an example implementation of an interpolate and align module configured to adjust a sampling phase of a sequence of sample values based on estimated sampling phases from preamble detection windows.

Phases may be expressed as degrees from 0° to 360°, or equivalently from 0 to $2\pi$ (0 to approximately 6.283) radians. Other embodiments are also possible, such as expressing phase in the range of $[-\pi, \pi]$, but the concepts remain similar. As on a circle, 0° and 360° may refer to the same point on the circle's circumference, and may likewise refer to the same phase. Phase wrapping may refer to situations where marginal phase changes cause the representation of the phase to "wrap around" across the 0°/360° (0/$2\pi$ radian) boundary, causing a small value (e.g. 0.05 radians) to suddenly jump to a large value (e.g. 6.2 radians), or vice-versa.

To illustrate the phase wrapping difficulty, reference is made to the example in the previous section in which the preamble is sampled S=4 times per cycle and the desired sampling phase is $3\pi/2$ (approximately 4.712) radians. At S=4 times per cycle, $2\pi$ radians (one full cycle)=4 T (four sampling timing signals). First, consider a policy in which the desired sampling phase is achieved (e.g. via the interpolate and align module 712 of FIG. 7) by adjusting the phase by ($3\pi/2-\theta_k$) radians in a manner that applies an integer phase shift which minimizes the required fractional phase shift. For this example, search window k may correspond to a qualifying window, based on which the parameter generation module may provide a $\theta_k$ phase estimate that will be used by the interpolate and align module to achieve the desired phase. Search window k+1 may correspond to a requalifying window, with the phase estimate $\theta_{k+1}$ used to again update the parameters. Now consider a case in which $\theta_k$=0.0157 radians and $\theta_{k+1}$=6.2675 radians. It should be noted that these phases are similar, with each very close to and on opposite sides of the 0 and $2\pi$ phase discontinuity, since an addition/subtraction of any multiple of $2\pi$ yields an equivalent phase, and because ($\theta_k+2\pi$)=(0.0157+$2\pi$)= 6.2989 radians. The time shifts used to adjust from the estimated phases to the desired phase can be computed as $\delta$=4×($3\pi/2-\theta$)/$2\pi$ (since $2\pi$ radians=4 T, this coverts a phase shift value of ($3\pi/2-\theta_k$) in radians to a value in time T). Thus, $\delta_k$=2.99 T and $\delta_{k+1}$=−0.99 T.

As depicted in FIG. 10A, phase shifts can be implemented using a tapped delay-line 1000, which may be an example of or included as part an interpolate and align module as in FIG. 7. The delay line may receive a sequence of sample values x, with each block along the delay line indicating a delay of one sample, or 1 T. The first block 1002 may contain the most recent sample value, while each following block contains a sample 1 T older than the last, up to an oldest sample in the last block 1004. As new samples are received, each sample is shifted down the line, so that the first block 1002 may shift to contain sample $x_{k+1}$, followed by $x_k$, all the way down to $x_{k-7}$, with $x_{k-8}$ being shifted out of the delay line entirely.

By operating on samples on a delay, the system may use a set of interpolation coefficients 1007 ($c_1(\alpha), c_0(\alpha), c_{-1}(\alpha)$) to interpolate values falling between two samples. A three tap interpolator 1007 is depicted (e.g. having three coefficients and operating on a set of three consecutive samples), but other numbers of taps may also be used. It should be noted that the three interpolation taps 1007 depicted in FIGS. 10A through 10C represent three taps that are being used, but there may be a physical tap after every sample, with the taps that aren't depicted not being used to generate each y sample value output.

The location that the delay line is tapped (e.g. which taps are utilized at any given time), and therefore which samples are interpolated, can be shifted up or down the line. Adjustment of the tapped location and of the interpolation coefficients may be used to achieve phase adjustments to a series of received sample values. The system may be configured to have a starting or default tap location, based on the center tap $c_0(\alpha)$, from which adjustments may be applied to shift the interpolation location. In the embodiment depicted in FIG. 10A, the starting tap location 1006 may be after the $6^{th}$ sample value, which at the current moment k includes the sample $x_{k-5}$. To accomplish a phase shift, the fractional portion of a phase shift can be achieved through the appropriate selection of interpolation coefficients ($c_1(\alpha), c_0(\alpha), c_{-1}(\alpha)$ for a desired fractional time shift $\alpha$) and the integer portion by the location the delay line is tapped.

The values of the interpolation coefficients may be obtained via a lookup table (LUT). The LUT may be populated with a value for $c_1$, $c_0$, and $c_{-1}$ for each fractional shift value a. For example, a values between [−0.50, 0.49] may each correspond to a set of three coefficient values (or however many taps are being employed), allowing the system to interpolate backwards or forwards from any sample by approximately 0.5 T. The interpolate and align module may output a value "y", based on the interpolated sample values, to an STM detection module.

Returning to the example above, the time shifts to achieve the $\delta_k$=2.99 T and $\delta_{k+1}$=−0.99 T phase adjustments can be seen in FIG. 10B. At time k (top) the phase is advanced forward in time by 3 T (e.g. shifted left by three samples from the starting tap location 1006 after the 6$^{th}$ sample to after the 3rd sample) and interpolated back by 0.01 T (applying an a value of −0.01) to achieve the 2.99 T phase shift. At time (k+1) (bottom), all the samples have been shifted right, with $x_{k-1}$ now being the most recent sample. Here, the phase is moved back in time by 1 T (e.g. shifted right by one sample from the starting tap location 1006 after the 6th sample to after the 7th sample), and interpolated forward by 0.01 T. It can be seen that the center-tap of the interpolation filter ($c_0(\alpha)$) multiplies $x_{k-2}$ at time k and $x_{k-5}$ at time (k+1). Therefore, if the time shift is held for 3 more clock cycles as the samples are continually shifted down the delay-line, $c_0(\alpha)$ will again multiply $x_{k-2}$ at time (k+4) and, thus, the phase wrapping in this example has caused 4 samples to be repeated. Had the phase wrap been in the other direction (e.g. $\theta_k=6.2675$ radians and $\theta_{k+1}=0.0157$ radians), 4 samples would have been omitted. In both cases, the stream of samples to the STM detection module has been disrupted. Since STM detection may rely on a continuous stream of samples, such a disruption occurring during samples associated with STM could cause the STM to go undetected. As such, the effect of phase wrapping caused by the changing phase estimates between updating windows should be appropriately handled for best results.

To avoid these phase wrapping problems, a policy should not be utilized which simply maps an estimated phase to a time shift without regard for previously used time shifts. Instead, updating a time shift may include taking into account the previously used time shift and utilizing the wrapping property of phases to maintain the continuity of the resulting sample sequence. For this, it may be noted that, for a preamble sampled S times per period, adding any integer multiple of S(T) may yield an equivalent sampling phase. As such, a variable $\text{Wrap}_k$ may be used to impart a phase wrap on the time shift generated by the utilized policy (the $\delta_k$) as, $$\tilde{\delta}_k = \delta_k + S \times \text{Wrap}_k, \quad (1)$$

where $\tilde{\delta}_k$ is the utilized time shift. Here, the value of Wrap may be reset to 0 ($\text{Wrap}_0=0$) when the transition is made to the STM search state, and may be updated each time a new phase estimate is generated based on an updating window. As each new time shift is generated by the utilized policy, it can be compared to the previously generated value to determine if a discontinuity has been crossed, which can be characterized by a change in time shift of magnitude greater than (S/2)T. When a discontinuity is observed, the value of $\text{Wrap}_k$ can be adjusted to disallow a discontinuity in the applied time shifts. For example, $\text{Wrap}_k$ may be incremented if the difference between two consecutive time shifts is below a first threshold, $\text{Wrap}_k$ may be left unchanged if the difference is above the first threshold and below a second threshold, or $\text{Wrap}_k$ may be decremented if the difference is above the second threshold. An example implementation may be shown as, $$\text{Wrap}_{k+1} = \begin{cases} (\text{Wrap}_k + 1) & \text{for } (\delta_{k+1} - \delta_k) < -S/2 \\ (\text{Wrap}_k - 1) & \text{for } (\delta_{k+1} - \delta_k) > S/2 \\ \text{Wrap}_k & \text{otherwise} \end{cases} \quad (2)$$

Returning to the previously used example, the transition from $\delta_k=2.99$ T to $\delta_{k+1}=-0.99$ T yields a difference of $(\delta_{k+1}-\delta_k)=(-0.99-2.99)T=-3.98$ T. The first condition in (2) holds and, therefore, the value of $\text{Wrap}_{k+1}$ may be incremented (to 1 assuming $\text{Wrap}_k=0$). Therefore, utilizing equation (1), the time shift may be set to, $$\tilde{\delta}_{k+1} = (-0.99 + 4 \times 1)T = 3.01 \text{ T} \quad (3)$$

which, as shown in FIG. 10C, does not induce a disruption in the generated sample sequence.

Following this example for one more update of the estimated phase, two different possibilities will be considered, ($\delta_{k+2}=-0.95$ T and $\delta_{k+2}=2.95$ T), which may update the value of Wrap as follows $$(\delta_{k+2}-\delta_{k+1})=(-0.95--0.99)T=0.04 \text{ T} \rightarrow \text{Wrap}_{k+2}=\text{Wrap}_{k+1}=1$$

$$(\delta_{k+2}-\delta_{k+1})=(2.95--0.99)T=3.94 \text{ T} \rightarrow \text{Wrap}_{k+2}=(\text{Wrap}_{k+1}-1)=0.$$

From these updated Wrap values, the utilized time shifts can then be computed as, $$\tilde{\delta}_{k+2}=(-0.95+4\times1)T=3.05 \text{ T}$$

$$\tilde{\delta}_{k+2}=2.95+4\times0)T=2.95 \text{ T},$$

which, in both cases, does not disrupt the resulting sample stream.

The wrapping occurring in the preceding example can be caused by the close proximity of the estimated sampling to the phase discontinuity in the considered policy occurring at 0 radians (this discontinuity may be in a different location for a different considered policy). In the case of a frequency offset, however, the sampling phase may ramp linearly away from $\theta_Q$ and, thus, the resulting tap location in the delay-line 1000 used by the interpolate & align module may move in a single direction away from its starting value. Eventually, this can cause the end of the delay-line 1000 to be reached. As such, the starting tap location 1006 may advantageously be set at or near the center of the delay-line 1000, and the delay-line's length may be made to accommodate the phase movement associated with the largest expected frequency offset over the longest expected written preamble length. Alternately, reaching the end of the delay-line 1000 may be declared an error condition, which may be implemented to cause the value of Wrap to be reset to 0. This could result in disrupting the sample stream as described above; however, it may only produce a single disruption, which may be unavoidable given the chosen implementation. An example method of handling phase wrapping issues when updating parameters for the STM search is provided in FIG. 11

Figure 11:
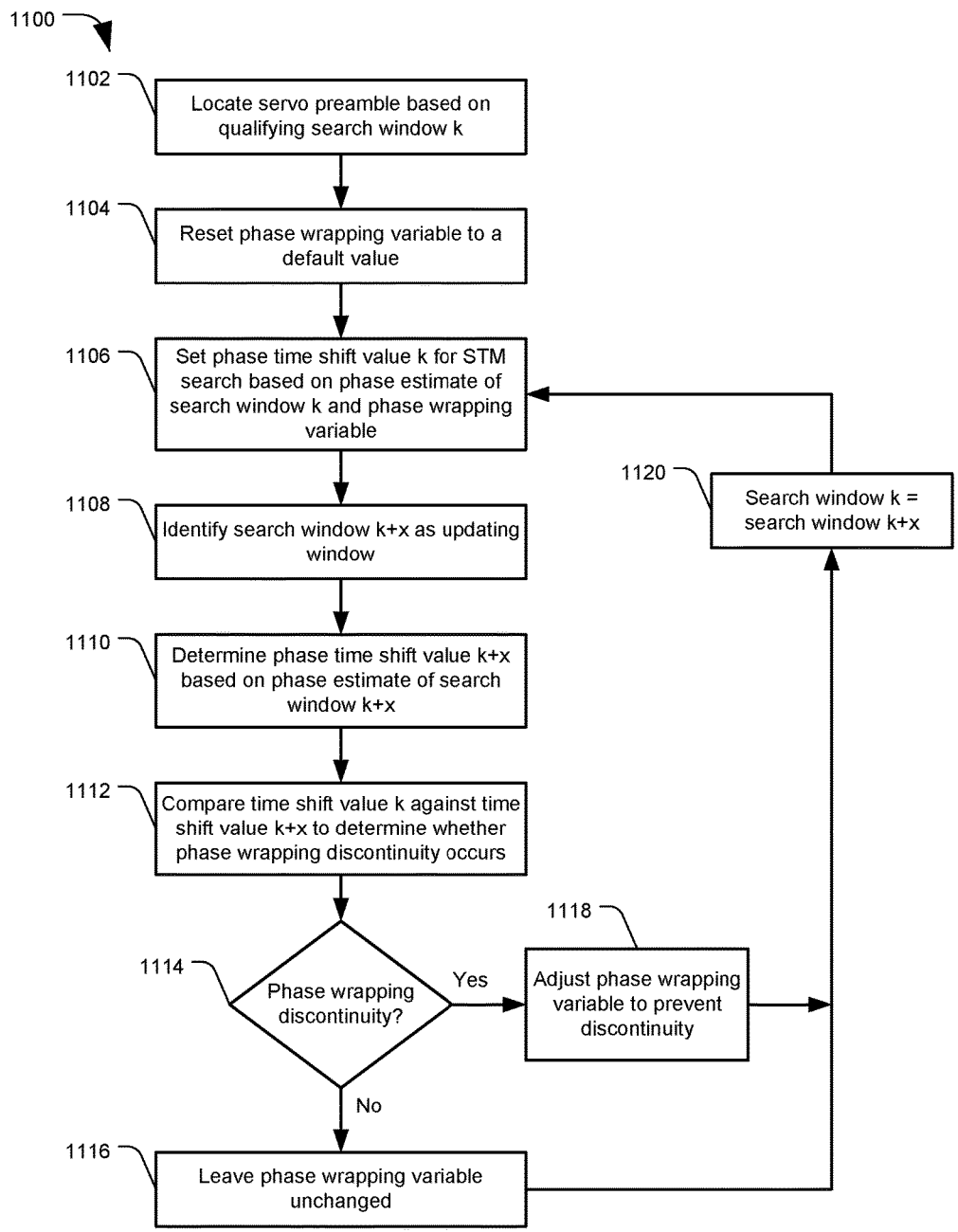
FIG. 11 is a flowchart of a method of servo sector detection, in accordance with certain embodiments of the present disclosure.

FIG. 11 is a flowchart of an example method 1100 of servo sector detection, in accordance with certain embodiments of the present disclosure. The method 1100 may be performed by a servo detection module as described herein.

At 1102, the method 1100 may include locating a servo preamble based on a qualifying search window 'k'. For example, search window k may be a detecting window that causes m out of the last n search windows to be detecting windows, thereby qualifying a servo preamble pattern. Locating a preamble may cause the system to initiate an STM search state, which may include resetting a phase wrapping variable (e.g. "Wrap", above) to a default value such as 0, at 1104. The method 1100 may include setting a phase time shift value k for the STM search based on a phase estimate for search window k and the phase wrapping variable, at 1106. As described above, setting the phase time shift value k may include shifting an interpolator's position along a delay line of sample values via an interpolate and align module.

When the STM search state is initiated, preamble detection operations may continue to occur, to determine whether the preamble is still detected while searching for the STM pattern. The preamble detection operations may identify a new search window k+x as an updating window, at 1108. The updating window k+x may be a detecting window that matches an expected preamble pattern, but may not be the search window immediately following search window k, depending on the system implementation (e.g. m out of the last n search windows are still detecting windows, but with m<n there is a possibility that at least one search window between search window k and search window k+x was not a detecting window). In some embodiments, all n of the previous search windows should be detecting windows in order for window k+x to qualify as an updating window, instead of merely having window k+x and m of the last n windows to be detecting windows. In addition, identifying search window k+x as an updating window may include verifying that a last number of samples 'p' from search window k+x correspond to a preamble pattern, and not just that search window k+x matches the preamble pattern as a whole.

The method 1100 may include determining a phase time shift value k+x based the phase estimate generated from search window k+x, at 1110. At 1112, the method 1100 may include comparing time shift value k against time shift value k+x, and determining whether a phase wrapping discontinuity would occur based on the comparison, at 1114. As described above, an example method to determine whether a phase wrapping discontinuity would occur may be to subtract the time shift value k from the time shift value k+x, and determining whether the result is below a first threshold or above a second threshold.

If no phase wrapping discontinuity would occur (e.g. if the results of the comparison do not exceed either threshold), the phase wrapping variable may be left unchanged, at 1116. If a phase wrapping discontinuity would occur, at 1114, the method 1100 may include adjusting the phase wrapping variable to prevent a discontinuity in the sample stream, at 1118. For example, the phase wrapping variable may be changed by a first amount (e.g. +1) if the first threshold was exceeded and by a second amount (e.g. −1) if the second threshold was exceeded. Properly applying the adjusted phase wrapping variable can prevent a discontinuity in the sample stream by ensuring the system continues to interpolate the correct sample values, so that no samples are doubled or omitted.

Once the phase wrapping variable has been adjusted at 1118 or left unchanged at 1116, the method 1100 may include setting search window k to be search window k+x, at 1120. This may be done because search window k+x becomes the most recent updating search window that will be considered for a next time shift calculation. The method 1100 may continue at 1106, by setting the current phase time shift value based on the most recent updating window and the phase wrapping variable.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit configured to detect a servo pattern within a signal, including:
perform a preamble detection operation to detect a preamble pattern within the signal;
in response to detecting the preamble pattern:
initiate a servo timing mark (STM) search state to locate an STM;
continue to perform the preamble detection operation;
in response to locating the STM, generate an indication that the STM is located;
in response to not locating the STM:
extend an STM search timeout period when the preamble pattern is still detected;
increment an STM search counter when the preamble pattern is not detected; and
exit the STM search state when the STM search counter exceeds the STM search timeout period.

2. The apparatus of claim 1 further comprising:
the circuit further configured to:
sample the signal to obtain sample values;
determine preamble sample values from the sample values that correspond to the preamble pattern;
determine signal reading parameters to apply during the STM search state based on the preamble sample values; and
detect the STM using the signal reading parameters.

3. The apparatus of claim 2 further comprising the signal reading parameters include a sampling phase adjustment.

4. The apparatus of claim 2 further comprising the signal reading parameters include a signal amplitude adjustment.

5. The apparatus of claim 2 further comprising:
the circuit further configured to:
divide the sample values into search windows having a selected number of consecutive sample values;
generate an error metric for each search window; and
declare the preamble pattern detected when a selected proportion of the most recent search windows have error metrics below a selected threshold.

6. The apparatus of claim 5 further comprising:
the circuit further configured to determine the signal reading parameters based on a last search window, which is the search window that causes the selected proportion of the most recent search windows having error metrics below the selected threshold to be reached.

7. The apparatus of claim 6 further comprising:
the circuit further configured to:
after initiating the STM search state, declare a next search window a requalifying window when the next search window maintains the selected proportion of most recent search windows having error metrics below the selected threshold;
update the signal reading parameters based on the sample values from the requalifying window.

8. The apparatus of claim 7 further comprising:
the circuit further configured to:
determine whether the requalifying window is a detecting window having preamble sample values corresponding to the preamble pattern by comparing the error metric for the requalifying window to the selected threshold;
update the signal reading parameters when the requalifying window is a detecting window; and
do not update the signal reading parameters when the requalifying window is not a detecting window.

9. The apparatus of claim 8 further comprising:
the circuit further configured to:
determine whether all of a selected number of most recent search windows are detecting windows, including the requalifying window;
update the signal reading parameters when all of the selected number of most recent search windows are detecting windows; and
do not update the signal reading parameters when less than all of the selected number of most recent search windows are detecting windows.

10. The apparatus of claim 9 further comprising:
the circuit further configured to:
determine whether the requalifying window is an updating window based on whether a selected number of last sample values from the end of the requalifying window correspond to the preamble pattern;
update the signal reading parameters when the requalifying window is an updating window; and
do not update the signal reading parameters when the requalifying window is not an updating window.

11. An apparatus comprising:
a circuit configured to detect a servo pattern within a signal obtained from a data storage medium, including:
sample the signal to obtain sample values;
determine preamble sample values from the sample values that correspond to a preamble pattern in the signal, including:
divide the sample values into search windows having a selected number of consecutive sample values;
generate an error metric for each search window;
compare the error metric to a selected threshold to determine if each search window is a detecting window that corresponds to the preamble pattern; and
declare the preamble pattern detected when a selected proportion of the most recent search windows are detecting windows;
determine signal reading parameters to apply during a servo timing mark (STM) search state, to locate an STM in the signal, based on the preamble sample values; and
detect the STM using the signal reading parameters.

12. The apparatus of claim 11 further comprising:
the circuit further configured to:
detect the preamble pattern based on the preamble sample values;
in response to detecting the preamble pattern:
initiate the STM search state;
continue to perform preamble detection;
in response to locating the STM, generate an indication that the STM is located;
in response to not locating the STM:
extend an STM search timeout period when the preamble pattern is still detected;
increment an STM search counter when the preamble pattern is not detected; and
exit the STM search state when the STM search counter exceeds the STM search timeout period.

13. The apparatus of claim 11 further comprising the signal reading parameters include a sampling phase adjustment.

14. The apparatus of claim 11 further comprising:
the circuit further configured to:
declare the preamble pattern detected when a selected proportion of the most recent search windows are detecting windows.

15. The apparatus of claim 14 further comprising:
the circuit further configured to:
after initiating the STM search state, declare a next search window a requalifying window when the next search window maintains the selected proportion of most recent search windows having error metrics below the selected threshold;
update the signal reading parameters based on the sample values from the requalifying window.

16. The apparatus of claim 15 further comprising:
the circuit further configured to:
determine whether the requalifying window is a detecting window by comparing the error metric for the requalifying window to the selected threshold;
update the signal reading parameters when the requalifying window is a detecting window; and
do not update the signal reading parameters when the requalifying window is not a detecting window.

17. The apparatus of claim 15 further comprising:
the circuit further configured to:
determine whether all of a selected number of most recent search windows are detecting windows, including the requalifying window;
update the signal reading parameters when all of the selected number of most recent search windows are detecting windows; and
do not update the signal reading parameters when less than all of the selected number of most recent search windows are detecting windows.

18. The apparatus of claim 15 further comprising:
the circuit further configured to:
determine whether the requalifying window is an updating window based on whether a selected number of last sample values from the end of the requalifying window correspond to the preamble pattern;
update the signal reading parameters when the requalifying window is an updating window; and
do not update the signal reading parameters when the requalifying window is not an updating window.

19. An apparatus comprising:
a circuit configured to detect a synchronization pattern within a signal from a data storage medium, including:
sample the signal using an analog to digital converter (ADC) to obtain preamble sample values from a preamble pattern of the signal;
determine signal reading parameters to apply based on the preamble sample values; and detect the synchronization pattern using the signal reading parameters, including:
in response to detecting the preamble pattern:
initiate a servo timing mark (STM) search state to locate the synchronization pattern;
continue to perform preamble detection;
in response to not locating the synchronization pattern:
extend an STM search timeout period when the preamble pattern is still detected;
increment an STM search counter when the preamble pattern is not detected; and
exit the STM search state when the STM search counter exceeds the STM search timeout period.

20. The apparatus of claim 19 further comprising:
the circuit further configured to:
detect the preamble pattern based on the preamble sample values;
in response to locating the synchronization pattern during the STM search state:
generate an indication that the synchronization pattern is located;
read servo data from a servo sector based on the synchronization pattern to identify a location of a read head relative to the data storage medium.

* * * * *